US009505169B2

(12) United States Patent
Herrmann

(10) Patent No.: US 9,505,169 B2
(45) Date of Patent: Nov. 29, 2016

(54) ULTRASOUND WELDING DEVICE COMPRISING VIBRATION-DECOUPLED COUNTER TOOL

(71) Applicant: Herrmann Ultraschalltechnik GmbH & Co. KG, Karlsbad (DE)

(72) Inventor: Thomas Herrmann, Karsruhe (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 14/647,418

(22) PCT Filed: Jan. 9, 2014

(86) PCT No.: PCT/EP2014/050281
§ 371 (c)(1),
(2) Date: May 26, 2015

(87) PCT Pub. No.: WO2014/111300
PCT Pub. Date: Jul. 24, 2014

(65) Prior Publication Data
US 2015/0306816 A1   Oct. 29, 2015

(30) Foreign Application Priority Data

Jan. 17, 2013   (DE) .................. 10 2013 100 474

(51) Int. Cl.
*B32B 37/00*   (2006.01)
*B29C 65/08*   (2006.01)
(Continued)

(52) U.S. Cl.
CPC .................. *B29C 65/08* (2013.01); *B06B 3/00* (2013.01); *B29C 65/085* (2013.01);
(Continued)

(58) Field of Classification Search
CPC ........... B06B 1/06; B06B 3/00; B29C 65/08; B29C 65/085; B29C 65/087; B29C 65/088; B65B 7/18; B65B 51/16; B65B 51/225

USPC .................. 156/73.1, 580.1, 580.2
See application file for complete search history.

(56) References Cited

U.S. PATENT DOCUMENTS 5,435,863 A * 7/1995 Frantz .................. B06B 1/0246
156/358
5,855,706 A * 1/1999 Grewell .................. B06B 1/023
156/358

(Continued)

FOREIGN PATENT DOCUMENTS

CN    101522397 A    9/2007
DE    199 06 873 A1   8/2000
(Continued)

OTHER PUBLICATIONS

Agnes Wittman-Regis, International Preliminary Report on Patentability, PCT/EP2014/050281, International Bureau of WIPO, Jul. 23, 2015.

(Continued)

*Primary Examiner* — James Sells
(74) *Attorney, Agent, or Firm* — Paul & Paul

(57) ABSTRACT

The invention relates to an ultrasound welding device (1) for ultrasonic machining of a material by means of a sonotrode (2) mounted in a vibration-decoupled manner, which sonotrode comprises a sealing surface having a cylinder barrel shape, and a counter tool (8), wherein a converter is connected to the sonotrode (2) optionally via a first amplitude transformation unit and the sonotrode (2) and the first converter are designed in such a manner that the sonotrode (2) can be set into vibration by means of a natural vibration of the ultrasonic frequency $f_S$.

5 Claims, 3 Drawing Sheets

(51) Int. Cl.
  *B06B 3/00* (2006.01)
  *B29C 65/00* (2006.01)
  *B65B 51/16* (2006.01)
  *B65B 51/22* (2006.01)
  *B65B 7/18* (2006.01)
  *B60B 1/06* (2006.01)
  *B29L 31/00* (2006.01)

(52) U.S. Cl.
  CPC .......... *B29C 65/087* (2013.01); *B29C 65/088* (2013.01); *B29C 66/1122* (2013.01); *B29C 66/43122* (2013.01); *B29C 66/816* (2013.01); *B29C 66/83413* (2013.01); *B29C 66/92431* (2013.01); *B29C 66/92613* (2013.01); *B29C 66/92651* (2013.01); *B29C 66/9512* (2013.01); *B60B 1/06* (2013.01); *B65B 7/18* (2013.01); *B65B 51/16* (2013.01); *B65B 51/225* (2013.01); *B29C 66/81433* (2013.01); *B29C 66/9513* (2013.01); *B29L 2031/7166* (2013.01)

(56) References Cited

U.S. PATENT DOCUMENTS

| | | | | |
|---|---|---|---|---|
| 5,976,316 | A * | 11/1999 | Mlinar | B06B 3/00 156/580.1 |
| 8,156,984 | B2 | 4/2012 | Wieduwilt et al. | |
| 8,858,742 | B2 * | 10/2014 | Spicer | B06B 3/00 156/351 |
| 8,899,295 | B2 * | 12/2014 | Vogler | B23K 20/106 156/580.1 |
| 8,950,458 | B2 * | 2/2015 | Patrikios | B06B 3/00 156/580.1 |
| 8,997,815 | B2 * | 4/2015 | Aizawa | B23K 20/10 156/359 |

FOREIGN PATENT DOCUMENTS

| | | |
|---|---|---|
| DE | 20 2005 012 029 U1 | 12/2005 |
| FR | 2 082 090 A | 11/1971 |
| WO | 2008/007256 A2 | 4/2008 |

OTHER PUBLICATIONS

The State Intellectual Property Office of the People's Republic of China, Appl. No. 201480003856.1, Office Action, Aug. 24, 2016, and English Translation.

* cited by examiner

ULTRASOUND WELDING DEVICE COMPRISING VIBRATION-DECOUPLED COUNTER TOOL

CROSS-REFERENCE TO RELATED APPLICATION

This is a national stage 371 application of International Application No. PCT/EP2014/050281, filed Jan. 9 2014.

The present invention concerns an ultrasound welding device for ultrasonic processing of a material with a sonotrode which is mounted in vibration-decoupled relationship and which has a sealing surface in the shape of a cylinder surface, and a counterpart tool, wherein a first converter is connected to the sonotrode optionally by way of a first amplitude transformation portion and the sonotrode and the first converter are so designed that the sonotrode can be caused to vibrate with a natural vibration of the frequency $f_S$.

Ultrasonic processing is a method of joining plastic materials. Ultrasound is a mechanical vibration above the audible limit. The frequency range begins at about 20 kHz and extends to frequencies of 1 GHz. Such ultrasound frequencies are frequently produced from electrical energy by means of piezoelectric sound transducers (converters). That mechanical vibration energy is applied to the workpiece or the material to be processed by way the sonotrode connected to the convertor, optionally by way of an amplitude transformation portion (booster). The surface of the sonotrode which is intended to come into contact with the material to be processed is also referred to as the sealing surface.

The ultrasound vibration unit therefore represents a structure which vibrates in operation and comprises the converter, optionally the amplitude transformation portion and the sonotrode.

In order to effectively transmit the ultrasonic vibration by means of the ultrasound vibration unit it is necessary for the ultrasound vibration unit to be brought to a state of resonance. Depending on the structure of the ultrasound vibration unit it has a plurality of natural frequencies. It is only when the converter produces a natural frequency of the ultrasound vibration unit that resonant vibration of the ultrasound vibration unit occurs. Therefore the converter and the ultrasound vibration unit must be matched to each other.

Strictly speaking the resonance frequency differs somewhat from the natural frequency as any real system is damped. Hereinafter however—as is also frequently the case in the literature—the terms resonance frequency and natural frequency are used synonymously.

The most important natural frequency of the ultrasound vibration unit is generally the natural frequency at which a standing longitudinal vibration with wave nodes and antinodes is produced in the ultrasound vibration unit. In that case a respective wave antinode is formed at the ends of the sonotrode.

Connected to one of the ends is the converter which produces the corresponding ultrasound excitation frequency. Possibly a booster or amplitude transformer is connected between converter and sonotrode, which alters the amplitude of the ultrasound vibration but not the frequency. The natural frequency of the sonotrode and thus the position of the vibration nodes of the longitudinal vibration are not influenced by the provision of a booster.

In the processing of materials by means of ultrasound generally the material to be processed is positioned between the sonotrode and a counterpart tool (which does not belong to the vibration structure) and which is occasionally also called the anvil. The sonotrode which is in contact with the material to be processed then transmits the ultrasound energy to the material to be processed, which is thereby for example welded or severed. The heat required to plasticize the material webs is produced by the conversion of ultrasonic vibrations into frictional energy. Heat which causes the plastic material to melt is thus produced by virtue of the interface and molecular friction.

In most sonotrodes the longitudinal ultrasonic vibration is used for energy transmission by way of the sealing surfaces.

There are however also sonotrodes, like that described here, with a sealing surface which is substantially in the shape of a cylinder surface, which use the radial ultrasonic vibration which is produced transversely relative to the longitudinal propagate direction of the ultrasonic vibration, for energy transfer. These are generally rotated about their longitudinal axis during the ultrasound processing operation so that the sealing surface rolls on the material to be processed. Those sonotrodes permit continuous processing.

The surface of the counterpart tool which is intended to come into contact with the material to be processed is frequently also referred to as the sealing surface.

Particularly when processing thicker materials like for example when sealing a gable seam of a folding carton pack like for example a milk carton the energy of continuous ultrasound welding devices in continuous processing, that is to say when using sonotrodes with a sealing surface in the shape of a cylinder surface, is no longer sufficient to reliably weld the gable seam.

It is therefore necessary to use sonotrodes which operate discontinuously, that is to say in a cycled relationship, with which the processing time is markedly longer.

WO 2008/037256 shows an ultrasound welding device having a sealing surface in the shape of a cylinder surface. Further, it is proposed to use a second sonotrode for ultrasonic processing. In FR 2 082 090 a corresponding sonotrode is described.

Taking the described state of the art as the basic starting point therefore the object of the present invention is to provide an ultrasound welding device of the kind set forth in opening part of this specification, with which even thicker materials can be processed in a continuous mode of operation with a low level of energy.

According to the invention that object is attained by an ultrasound welding device according to the present invention.

Just as in the case of the sonotrode therefore it is provided that the counterpart tool is caused to vibrate without a major proportion of that vibration being transmitted to the holder.

That means that the point at which the holder engages the sonotrode or the counterpart tool must be tuned to the natural vibration of the ultrasonic frequency $f_G$. When the counterpart tool or the sonotrode is caused to vibrate, that is to say it is put into the condition of resonance, then standing waves are formed within the counterpart tool or sonotrode with vibration maxima and vibration minima. A vibration-decoupled mounting arrangement occurs only when the holder engages the sonotrode or the counterpart tool in a region at which there is a vibration minimum.

The counterpart tool should be so designed that there is a vibration maximum at the sealing surface at a natural vibration of the ultrasonic frequency $f_G$.

If now a material is acted upon with an ultrasonic vibration by way of the sonotrode, between the sonotrode on the one hand and the counterpart tool on the other hand, then the counterpart tool can also be caused to vibrate, which causes the counterpart tool to also process the material whereby the welding efficiency is improved.

According to the invention, the counterpart tool is also excited with an ultrasonic natural vibration so that the material is processed both by the sonotrode and also by the counterpart tool. Basically then the counterpart tool also represents the sonotrode.

In a preferred embodiment the frequency $f_G$ is equal to the frequency $f_S$ or an integral multiple thereof. Particularly when the counterpart tool is not caused to vibrate by means of a converter, it is advantageous if the natural frequency of the counterpart tool substantially corresponds to the natural frequency of the sonotrode as then the sonotrode, by way of its ultrasonic vibration, can cause the counterpart tool to be in a condition of resonance vibration, by way of the material. It will be appreciated that a natural frequency can also be selected for the counterpart tool, which is an integral multiple of the natural frequency of the sonotrode.

According to the invention, it is intended that the natural frequency $f_G$ is not equal to the frequency $f_S$ and is not an integral multiple thereof. It has been found in particular that preferably $$\frac{|f_G - f_S|}{f_S} \le 0.4$$

and particularly preferably $$\frac{|f_G - f_S|}{f_S} \le 0.2.$$

For example the sonotrode could be excited at a frequency of 30 kHz while the counterpart tool is excited at a frequency of 35 kHz. The 30 kHz vibration is far enough away from the 35 kHz natural frequency of the counterpart tool so that there is almost no energy transfer between sonotrode on the one hand and counterpart tool on the other hand.

The ultrasound processing operation can be markedly improved by the different vibration frequencies.

Particularly preferably the ultrasound welding device has a drive for rotation of the sonotrode, the sonotrode being of a substantially rotationally symmetrical configuration.

In the same fashion there can be provided a drive for rotation of the counterpart tool, wherein the counterpart tool is preferably substantially of a rotationally symmetrical configuration and has a sealing surface in the shape of a cylinder surface. In that case the counterpart tool and the sonotrode best rotate in opposite relationship so that the material is moved through between the sonotrode on the one hand and the counterpart tool on the other hand during ultrasound processing between sonotrode and counterpart tool.

The sealing surface of the sonotrode and/or the sealing surface of the counterpart tool can be structured, wherein the term structuring is used to denote any kind of projection or recess on or within the sealing surface.

In a further preferred embodiment the spacing between the sonotrode and the counterpart tool is adjustable. Particularly preferably there is provided an abutment so arranged that a minimum spacing between sonotrode and counterpart tool is maintained.

Further advantages, features and the present invention will be apparent from the description hereinafter of a preferred embodiment. In the drawing.

Figure 1:
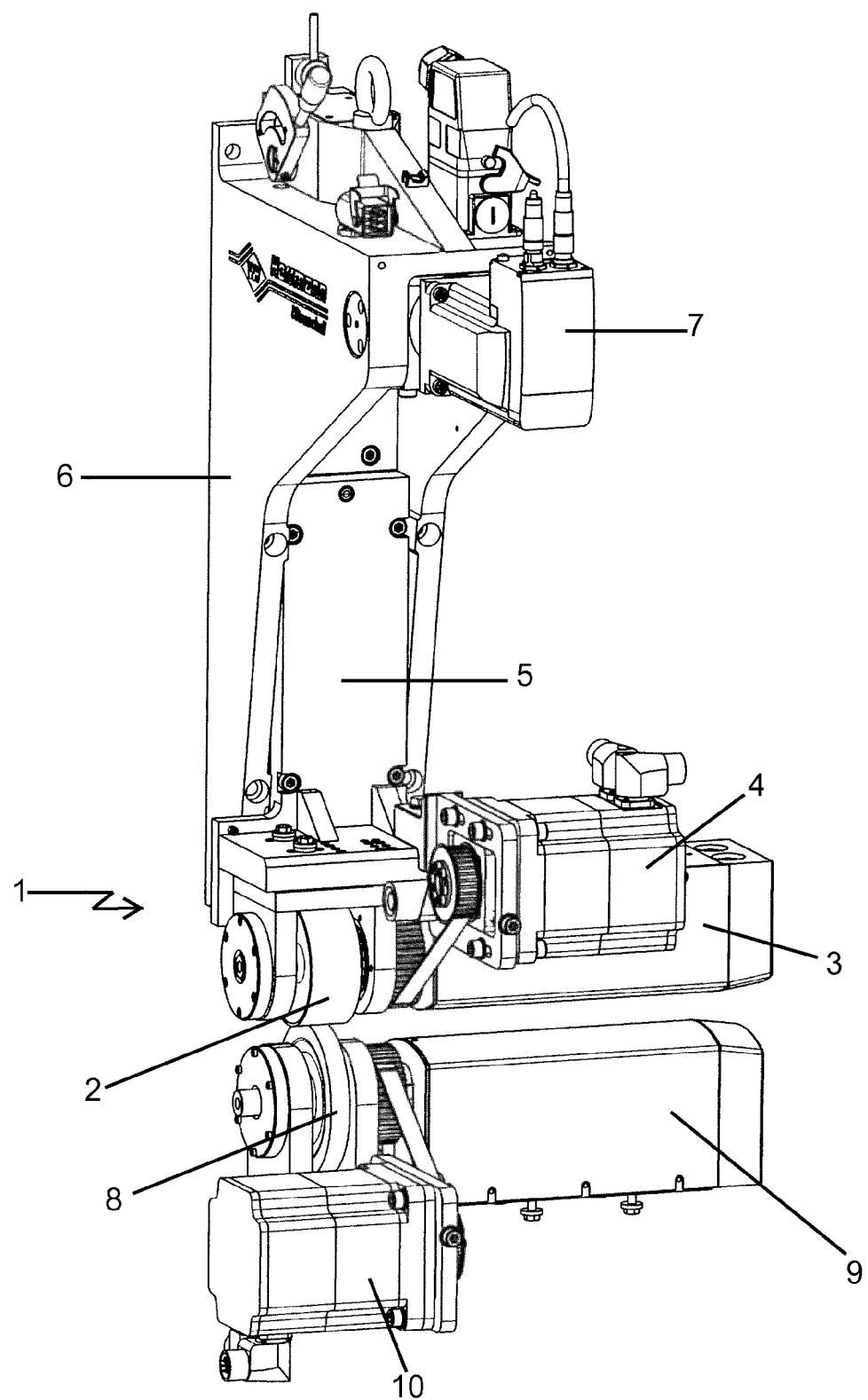
FIG. 1 shows a first perspective view of a preferred embodiment.

FIG. 1 shows an ultrasound welding device according to the invention. The ultrasound welding device 1 has a vibration-decoupled sonotrode 2 having a sealing surface in the shape of a cylinder surface. The sonotrode 2 is connected to a converter by way of an amplitude transformation portion. Converter and amplitude transformation portion are disposed in the housing 3. The sonotrode 2 can be put into a state of ultrasonic vibration by means of the converter. There is further provided a drive 4, by means of which the sonotrode 2 can be rotated about its longitudinal axis. The sonotrode 2 or its holder is fixed to a carriage 5 which in turn can be moved relative to the support stand 6 by means of the motor 7 in order to adjust the spacing of the sonotrode 2 relative to the counterpart tool 8.

The gap width between sonotrode and counterpart tool can be adjusted by means of the motor. That also permits regulation of the gap width during the processing operation. Thus for example the gap size could be measured and regulated to a predetermined target value. As an alternative thereto the force with which the sonotrode is on the counterpart tool or the material to be processed, which is guided along the counterpart tool, could be measured and regulated to a predetermined value. For many situations of use it is also possible to measure the electric power input of the ultrasound vibration unit and regulate it to a predetermined value. In that respect the control parameter is the position of the sonotrode which can be altered by means of the motor.

The counterpart tool 8 is also connected to a converter by way of an amplitude transformation portion, the converter and the amplitude transformation portion being disposed in the housing 9. The result of that is that the counterpart tool 8 can also be acted upon with an ultrasonic vibration. The counterpart tool 8 also has a sealing surface in the shape of a cylinder surface and can be rotated about its longitudinal axis by means of the drive 10.

It will be noted that the sealing surface of the counterpart tool and the sonotrode in this embodiment are of different widths.

Figure 2:
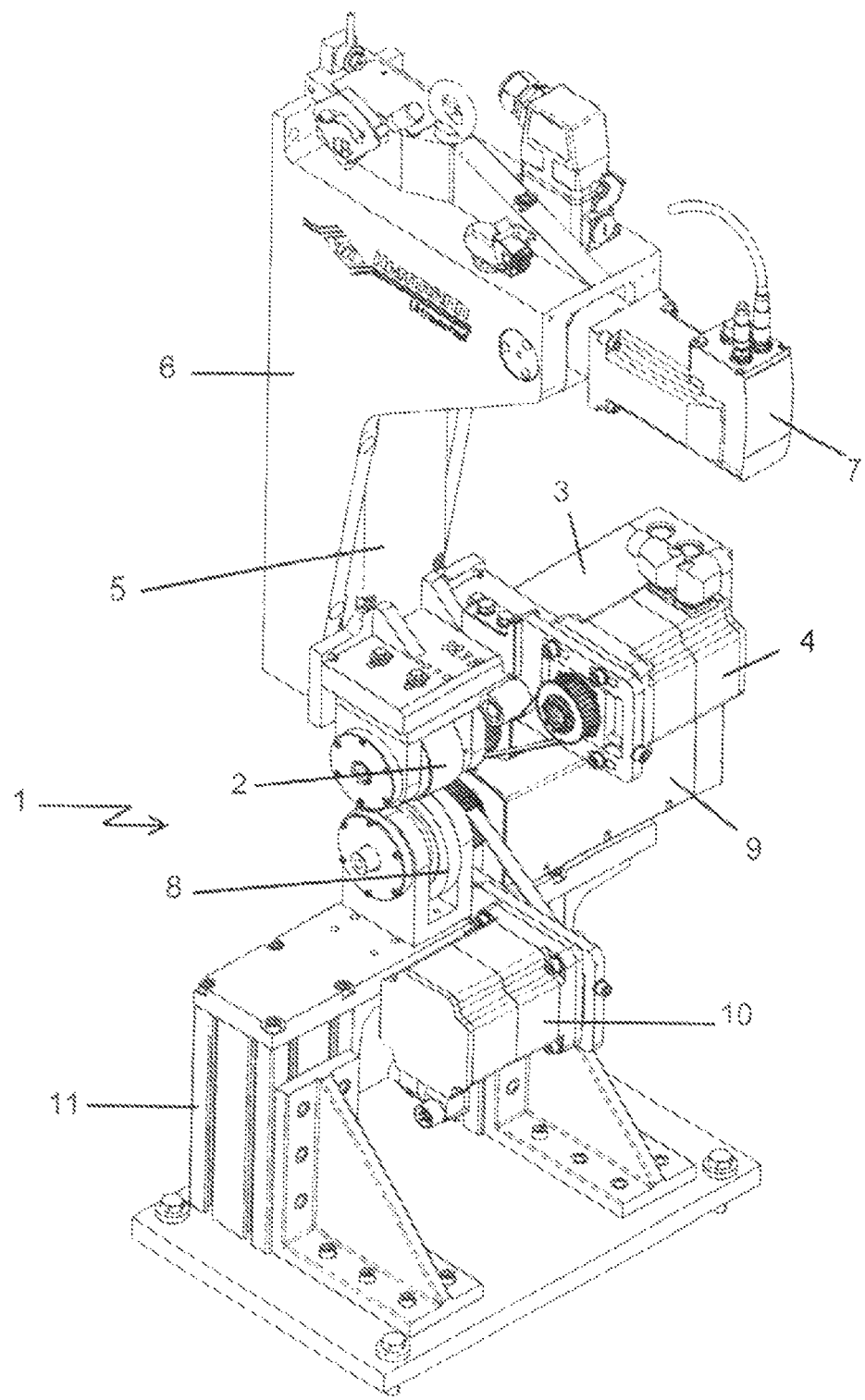
FIG. 2 shows a second perspective view of the embodiment of FIG. 1.

FIG. 2 shows a second perspective view. Here too it can be seen that the counterpart tool 8 is mounted by way of its holder to the machine stand 11. Nonetheless here too the mounting of the counterpart tool 8 is vibration-decoupled so that the counterpart tool can be acted upon with an ultrasonic vibration without a large part of the vibration energy being transmitted to the machine frame 11.

Figure 4:
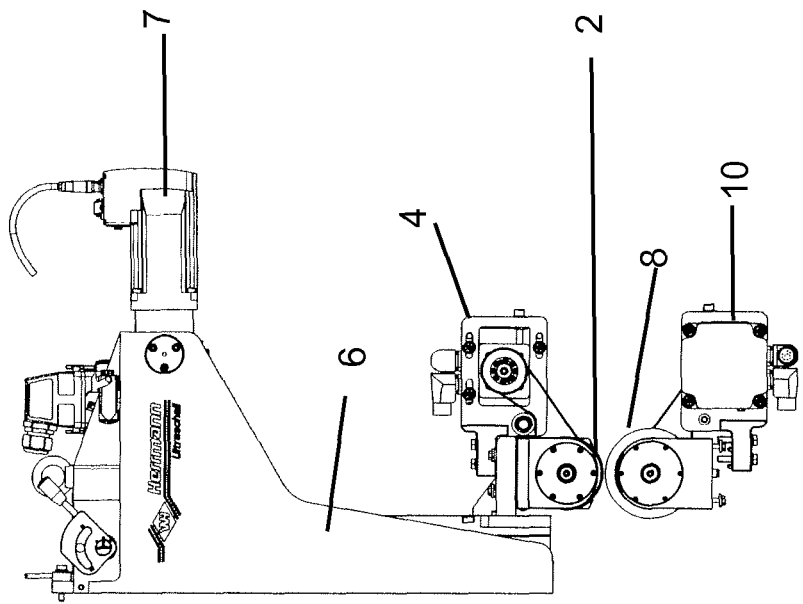
FIG. 4 shows a side view of the embodiment of FIG. 1.
Figure 3:
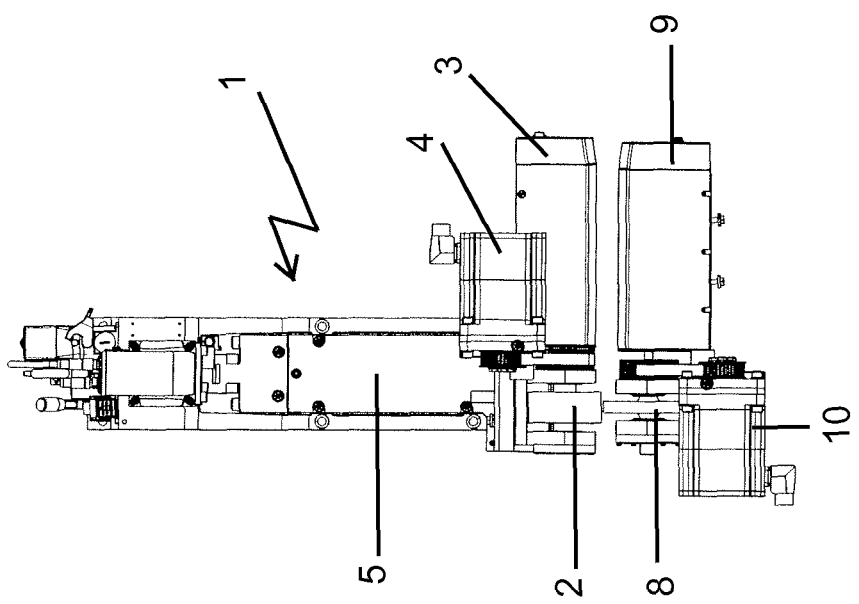
FIG. 3 shows a plan view of the embodiment of FIG. 1.

FIGS. 3 and 4 show two further views of the embodiment of FIG. 1. The material to be processed is moved through between the sonotrode 2 and the counterpart tool 8 and processed as it moves. The described embodiment is particularly suitable in particular for ultrasound processing of gable seams.

LIST OF REFERENCES 1 ultrasound welding device
2 sonotrode
3, 9 housing
4, 10 drive
5 carriage
6 support stand 7 motor
8 counterpart tool
11 machine frame

The invention claimed is:

1. An ultrasound welding device (1) for ultrasonic processing of a material with a sonotrode (2) which is mounted in vibration-decoupled relationship and which has a sealing surface in the shape of a cylinder surface, and a counterpart tool (8), wherein a converter is connected to the sonotrode (2) optionally by way of a first amplitude transformation portion and the sonotrode (2) and the first converter are so designed that the sonotrode (2) can be caused to vibrate with a natural vibration of the ultrasonic frequency $f_S$, wherein the counterpart tool (8) has a natural vibration of the ultrasonic frequency $f_G$ and is mounted in vibration-decoupled relationship in such a way that it can be excited with the ultrasonic frequency $f_G$, a second converter is connected to the counterpart tool (8) optionally by way of a second amplitude transformation portion and the counterpart tool (8) and the converter are so designed that the counterpart tool (8) can be caused to vibrate with a natural vibration of the frequency $f_G$, characterised in that the natural frequency $f_G$ is not equal to the frequency $f_S$ and is not an integral multiple thereof.

2. An ultrasound welding device (1) as set forth in claim 1 characterised in that there is provided a drive (4, 10) for rotation of the sonotrode (2), wherein the sonotrode (2) is preferably of a substantially rotationally symmetrical configuration.

3. An ultrasound welding device (1) as set forth in claim 1 characterised in that there is provided a drive (4, 10) for rotation of the counterpart tool (8), wherein the counterpart tool (8) is preferably of a substantially rotationally symmetrical configuration and has a sealing surface in the shape of a cylinder surface.

4. An ultrasound welding device (1) as set forth in claim 1 characterised in that the sealing surface of the sonotrode (2) and/or the sealing surface of the counterpart tool (8) are structured.

5. An ultrasound welding device (1) as set forth in claim 1 characterised in that the spacing between sonotrode (2) and counterpart electrode (8) is adjustable, wherein there is preferably provided an abutment so arranged that a minimum spacing between sonotrode (2) and counterpart tool (8) is observed.

* * * * *